United States Patent [19]

Hanson

[11] Patent Number: 4,582,472

[45] Date of Patent: Apr. 15, 1986

[54] MACHINE FOR FORMING CROISSANTS OR OTHER ELONGATED PRODUCTS

[76] Inventor: Douglas R. Hanson, 1720 - 9th Ave. South, Anoka, Minn. 55303

[21] Appl. No.: 714,638

[22] Filed: Mar. 21, 1985

[51] Int. Cl.⁴ .............................................. B29C 53/00
[52] U.S. Cl. .................................... 425/139; 425/150; 425/391; 425/394; 425/409; 425/437; 425/438; 425/442
[58] Field of Search ............ 425/135, 139, 383, 387.1, 425/391, 397, 393, 403, 406, 423, 437, 442, 150, 450.1, 319, 394, 395; 99/426, 439, 441, 442

[56] References Cited

U.S. PATENT DOCUMENTS

| | | | |
|---|---|---|---|
| 2,458,338 | 1/1949 | Buechek | 425/391 |
| 4,036,569 | 7/1977 | Oshikiri | 425/135 |
| 4,431,396 | 2/1984 | Lee | 425/383 |

FOREIGN PATENT DOCUMENTS 3323918  12/1984  Fed. Rep. of Germany ...... 425/391

Primary Examiner—Willard E. Hoag
Attorney, Agent, or Firm—Kinney & Lange

[57] ABSTRACT

A forming machine forms elongated rolls of croissant dough into a curved form, and in particular the apparatus shown pinches the ends of the elongated dough together after it has been folded around a forming mandrel. The sequence is done as the dough is moved along a conveyor automatically and at a high rate of speed.

15 Claims, 8 Drawing Figures

MACHINE FOR FORMING CROISSANTS OR OTHER ELONGATED PRODUCTS

BACKGROUND OF THE INVENTION

1. Field of the Invention.

The present invention relates to a machine and a method for forming elongated material pieces into a generally curved configuration, for example for bakery products, such as croissants.

2. Description of the Prior Art.

Dough handling machines have become sophisticated in recent years, but generally the machines relate primarily to the panning of dough pieces for buns and the like. The forming of intricate shapes still is largely a manual task. Moving dough pieces along conveyor belts during processing is well known, but to date forming curved pieces such as for croissants, even though they are not twisted about their longitudinal axes, has not been accomplished. Because of the competitive nature of fast food chains in particular, reduction in labor costs for handling large quantities of such formed bakery products is desirable.

SUMMARY OF THE INVENTION

The present invention relates to a machine and method for forming elongated pieces of material about an axis that is generally perpendicular to the longitudinal axis of the material piece, comprising folding the ends of the material piece toward each other around a forming member defining the central axis and leaving a central recess or opening in the formed material piece.

Specifically, the apparatus and method described herein are adapted for forming dough piece, such as for croissants from preformed, elongated dough pieces moving in a path of movement generally with the elongated axes of the individual dough pieces perpendicular to the direction of movement.

Because the croissant has an open region in the center, even when they are formed so that the ends of the dough pieces are touching each other, that is the croissant is folded back on itself with the ends fastened together, the need for a mandrel for providing this central opening is present. Further complicating the matter is the fact that the dough pieces will move in their path of travel at spaced intervals, and the spacing may not be uniform because of irregularities of feeding from the source of supply (which can be conventional bakery forming equipment and conveyor belts).

Thus, the present device provides a means for sensing each individual dough piece as it moves in its path of travel and provides a forming actuator as shown an openable and closable, clam shell-like cup that responds to the sensed location of the elongated dough piece relative to a mandrel that is substantially midway between the ends of the dough piece and perpendicular to the plane of movement of the dough piece. When the sensed signal has been received, the forming actuator will move into position behind the dough piece, and continue to move in the same direction as the movement of the dough piece in its path of travel as the clam shell forming actuators move to form the dough piece (or other material) about the mandrel.

In the specific form shown, the clam shell forming actuators are semi-cylindrical cup portions pivoted together at their edges, about an axis parallel to the axis of the cylinder forming the clam shell portions so that the free ends of the cylindrical cup members will move together and as they move together form the dough piece ends around the mandrel and tend to pinch the ends together on the opposite side of the mandrel from the clam shell pivot axis in the final position of operation.

Once a forming action has taken place, the clam shells open quickly, and in the form shown return to their original position. Various forms of mounting the clam shell could be used, but it is important to note that the dough pieces move between the clam shell and the support conveyor belt, so that the clam shell has to be moved away from the conveyor belt to let a dough piece pass, and then move to over take and engage the dough piece for forming by more rapid movement of the clam shell in the direction of movement of the dough piece so that the forming operation occurs quickly and smoothly.

In instances where smooth speed of travel is of importance, and where a central forming mandrel is not critical, the clam shell forming actuators can be mounted onto a wheel so that there is continuous movement and recyling of the forming actuators as the actuators rotate in a path of travel. The clam shell forming actuators move from position above the dough piece to engage the dough piece when the clam shells initially start the forming operation. The clam shell actuators move faster then the dough piece as the actuators close to pinch the ends of the dough piece together. If a wheel support is used, the forming actuators raise away from the plane of movement of the dough pieces sufficiently after the forming operation to permit that dough piece to be moved along for baking without interference.

DETAILED DESCRIPTION OF THE PREFERRED EMBODIMENTS

Figure 1:
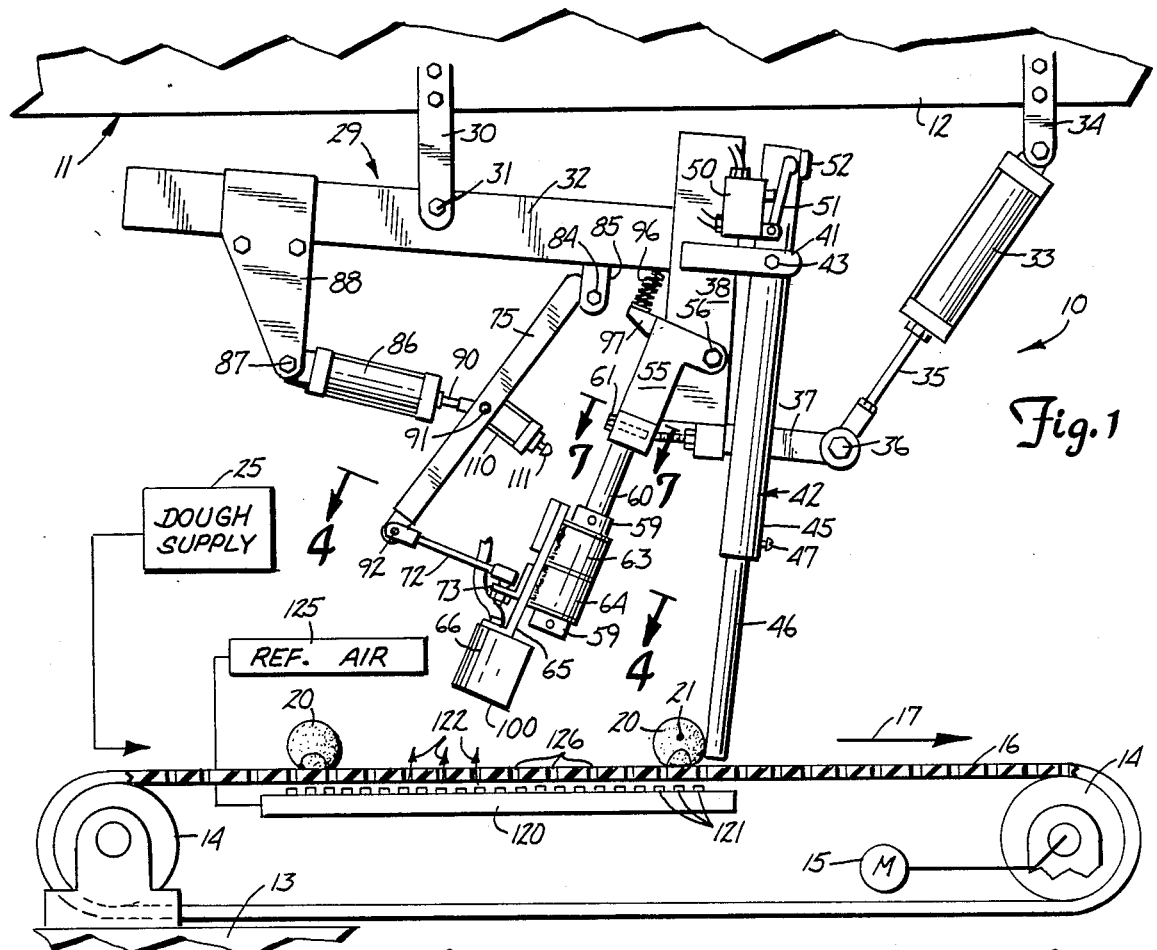
FIG. 1 is a side elevational view of an apparatus for forming croissants made according to the present invention, with the means for conveying the croissants in the frame shown schematically.

A machine for forming croissants and similar dough pieces is shown generally at 10 and comprises a frame 11 that has an overhead member 12, and a lower frame member 13 shown only partially but which is joined to the over head member. The lower frame 13 is used for mounting suitable rollers 14,14, which are driven by a motor shown generally at 15 in the usual manner for moving a conveyor belt 16 of conventional design in a direction of movement as shown by the arrow 17. The conveyor belt 16 forms a general plane or path of movement for elongated dough pieces which are shown generally at 20, in FIG. 1, and in top view in FIG. 5. The dough pieces 20, when placed on the conveyor belt 16 have longitudinal axes as shown at 21 in FIG. 5, extending generally straight and perpendicular to the direction of movement which is represented as arrow 17.

Figure 5:
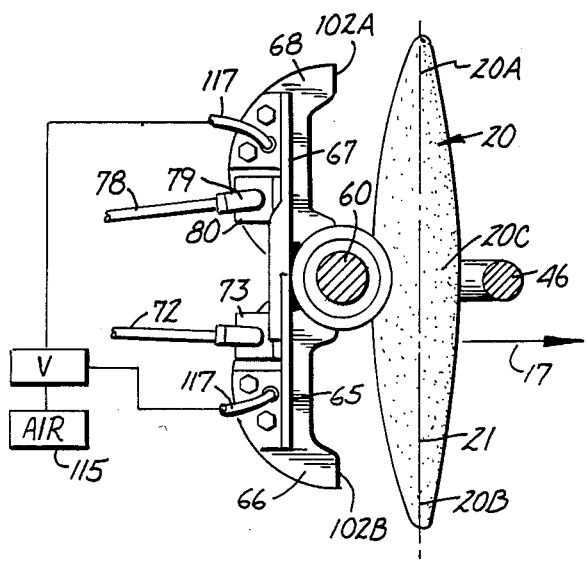
FIG. 5 is a schematic representation of a typical elongated dough piece in position against the mandrel for forming, and with the clam shell type dough forming actuator in a position moving toward the dough piece for forming.

The individual dough pieces 20 are spaced along the conveyor belt 16, and thus as they move they define a general plane of movement defined by the contact line between the lower portion of the dough piece 20 and the conveyor belt 16, as moving in the direction of movement of the arrow 17. The dough pieces 20 come from a dough supply indicated generally at 25 which can be any conventional type of conveyor for forming the dough pieces 20 into their elongated shape. As can be seen the end portions of the dough piece shown at 20A and 20B are somewhat narrower or smaller in diameter than the center portion of the dough piece. That is, the midpoint 20C between the ends 20A and 20B is larger size. These portions are represented in FIG. 5.

The dough forming apparatus 10 includes, as shown, a frame assembly 29 which is pivotally mounted to a first support member 30 that is supported from the upper frame member 12. A frame assembly is mounted to a first pivot axis 31 with a pivot bolt passing through a frame member 32 forming part of frame assembly 29. The frame member 32 is controlled for movement about the pivot axis 31 through the use of a pneumatic cylinder assembly shown at 33 which has its base connected to a strap 34 fixed to the frame member 12, and which is a double acting cylinder having an extendable and retractable rod 35. The rod 35 is connected with a suitable connector pin 36, through a rod end, to a bracket 37 that in turn is fixed to an upright leg 38 that is fixed rigid with respect to the frame member 32. Thus the members 32 and 38 make up a frame assembly 29.

The leg 38 in turn has a pair of straps 41 fixed thereto and extending forwardly therefrom, on which a mandrel assembly 42 is pivotally mounted with a bolt 43. The pivot bolt 43 is generally parallel to the pivot bolt 31, so that the pivots 31 and 43 both are generally parallel to the axis 21 of each of the elongated dough pieces 20.

The mandrel assembly 42 comprises an outer tube 45, and a mandrel section 46 which is adjustable toward and away from the conveyor belt 16 through the use of an adjustment screw such as that shown at 47. The mandrel 46 preferably is made of an inert low friction plastic material such as a suitable Nylon, Teflon or the like, and the mandrel can be adjusted in length so that its lower end is closely adjacent the upper surface of the conveyor belt 16, and movable to a position to be intercepted or contacted by the dough pieces 20 as they move along their path of movement on the conveyor belt 16. The mandrel 46 is positioned so that it will be engaged by the dough pieces generally in the central portion 20C.

When the mandrel 46 is engaged by a dough piece, and the dough piece is moving in its path of movement, the mandrel 46 and the entire mandrel assembly 42 will tend to be pivoted about the pivot axis of bolt 43, and this in turn will actuate, in the form shown, a first sensor 50 that in the form shown is a pneumatic valve having an actuating element 51 engaged by a lug 52 on the mandrel assembly 42. This valve 50 in turn will be used for controlling pneumatic cylinders or other suitable actuators, as will be explained. Valve 50 is mounted directly on the leg 38 in a suitable manner.

Thus it can be seen that the mandrel 46 forms a part of the sensor for determining when the dough piece is in a particular position, because it actuates a valve 50 in response to the engagement with the dough piece.

Figure 7:
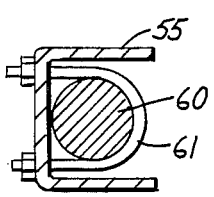
FIG. 7 is a sectional view taken generally along line 7—7 in FIG. 1.
Figure 8:
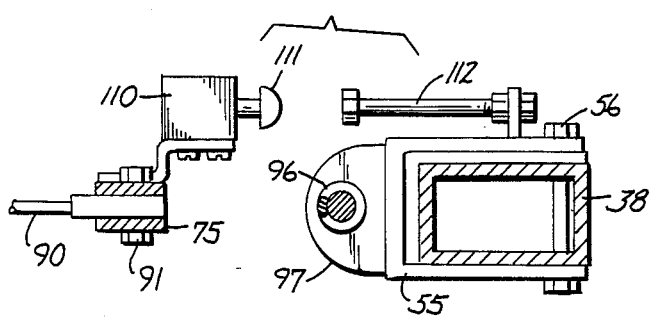
FIG. 8 is a sectional view taken as on line 8—8 in FIG. 2.

The croissant forming apparatus further includes a clam shell or forming actuator mounting bracket 55 which is pivoted to the leg 38 about a pivot axis parallel to the axes of the bolts 31 and 43, and this pivot axis is defined by a pivot bolt 56. The mounting bracket 55, as shown in FIG. 8 in particular is a channel shaped member, having side legs that fit along the sides of the rectangular cross section leg 38. In a first position, the channel shaped member 55 in FIG. 1 is retracted as shown in FIG. 1, and as can be seen the member 55 mounts a pivot shaft 60 that extends downwardly therefrom. The shaft 60 is held in place with a suitable U bolt as shown in FIG. 7 at 61.

The lower end of the pivot shaft 60 has first and second pivoting sleeves mounted thereon and held on the shaft 50 with adjustable collars 59. The first pivoting sleeve is the upper one, and is shown at 63, and the second sleeve is the lower one and it is shown at 64. The first sleeve 63 has a first support bracket 65 mounted thereon, and this support bracket is made so that it will pivot with the sleeve 63. The support bracket extends downwardly along the outside of the lower pivot sleeve 64, and is mounted onto the first forming actuator cup portion indicated at 66 that will also be referred to as a clam shell cup portion. The bracket 65 is mounted to the upper wall of this clam shell cup portion and can perhaps best be seen in FIGS. 5 and 6. The bracket 65 also can be seen in FIG. 2 when it is in its closed forming position.

The lower pivot sleeve 64 is connected to a bracket 67. The bracket is welded to this pivot sleeve, and the bracket 67 in turn is connected to a second forming actuator or clam shell cup portion 68. The second clam shell cup portion 68 also has an upper wall to which the bracket 67 is mounted.

These two forming clam shell cup portions 66 and 68 thus do form clam shell type halves because they are pivoted together for opening and closing movement about an axis that is the central axis of the pivot shaft 60. As shown in FIG. 5, the central axis of the pivot shaft 60 lies substantially along a diametral plane of these generally cylindrical clam shell cup portions when they are in their open position, and it is between the clam shell cup portions so that they act as a clam shell as they are moved together.

Figure 4:
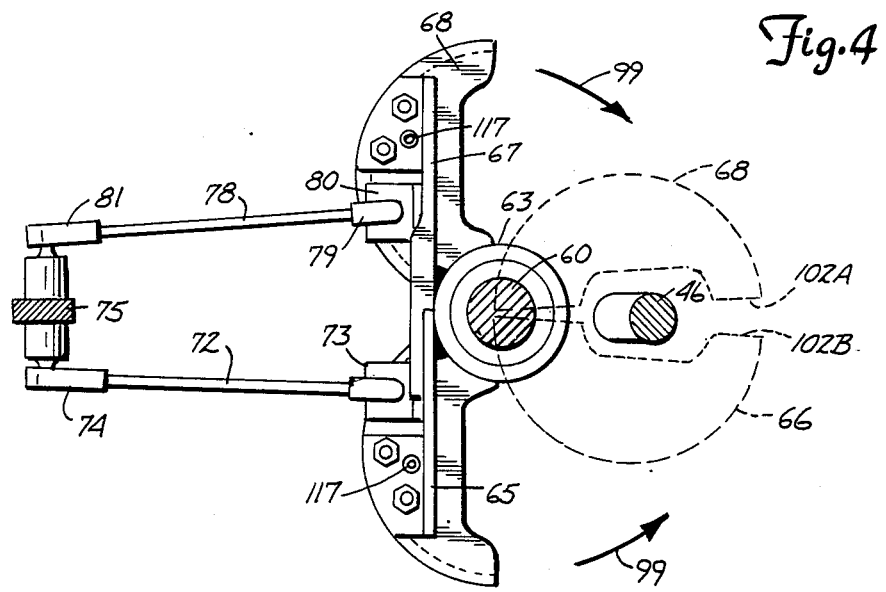
FIG. 4 is a sectional view taken to show the clam shell type forming cups in their open position, taken generally along 4—4 in FIG. 1.

The pivoting action is shown in FIG. 4, from the solid line open position to the dotted line closed position, around the mandrel 46.

The pivoting of the clam shell cup portions is controlled by a first link 72 which is connected with a bracket 73 to the bracket 65, through a universal pivoting rod end connection, and the opposite end of the link 72 is connected through a rod end 74 to the end of an actuator link 75.

The clam shell cup portion 68 is controlled through the use of a link 78. The link 78 is connected with a rod end 79 to a bracket 80 which in turn is connected to the bracket 67 for the clam shell cup portion 68. The opposite end of the link 78 is connected with a rod end member 81 to the arm or control lever 75 through a suitable connecting pin for the rod end 81. The arm 75 in turn is pivotally mounted about the axis of a pivot bolt 84 at its upper end to a bracket 85 which in turn is fixed to the frame member 32 and is positioned below it.

The arm 75 will move from a retracted position to a forming position about this pivot bolt 84, as will be explained.

The movement of the arm 75, as well as the arm 55 is controlled by a pneumatic cylinder shown at 86. The pneumatic cylinder 86 has its base end connected as at 87 to a bracket 88 fixed to the frame member 32, and has a longitudinal extendable and retractable rod 90 that has a rod end that is pivotally connected with a pivot bolt 91 in the midportion of the arm 75, that is between the pivot axis of bolt 84, and the pivot axis of the rod ends 74 and 81. The pivot axis of the rod ends 74 and 81 is shown generally at 92 in FIG. 1.

When a croissant dough piece 20 has been sensed by mandrel 46, and the valve 50 is operated, the rod 90 of cylinder 86 will extend, and as can be seen a compression spring 96 that acts between the arm 38 and the lug 97 on arm 55, tends to urge the arm 55 about the axis of pivot bolt 56, and thus as soon as the rod 90 starts to extend, the arm 55 will move before the links 72 and 78 tend to move the clam shell cup portions about the axis of the pivot shaft 60.

Figure 2:
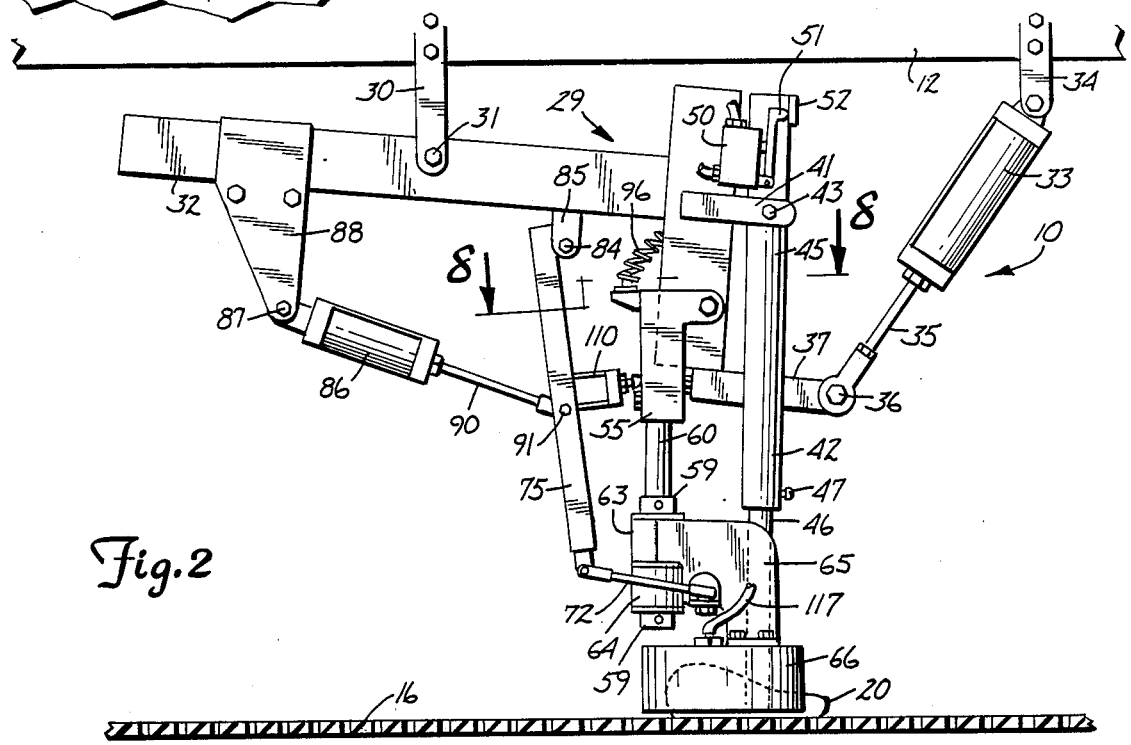
FIG. 2 is a view of FIG. 1 in an initial stage of forming the croissant around a central mandrel.

As the arm 55 moves, the base of the channel shaped arm 55 contacts an abutment on tube 38 that can be adjustable if desired to stop the movement of the arm 55 about the pivot axis of bolt 50 relative to the arm 38. Then, further movement of the rod 90 outwardly will cause the links 72 and 78 to push on the respective brackets 65 and 67, tending to swing the clam shell cup portions toward their closed positions generally as shown by the arrows 99 in FIG. 4. Because the dough piece that triggered the movement of the mandrel 46 is in position as shown in FIG. 1, this movement of the clam shells will be along an arc that will bring the lower edges of the clam shell cup portions, and the plane 100 defined by these lower edges of the clam shell cup portions down toward the belt 16, (toward the plane of movement of the dough pieces) and thus when the arm 75 moves to its position as shown in FIG. 2, plane 100 is very close to the upper surface of the belt 16 and is moving faster than the belt.

Figure 6:
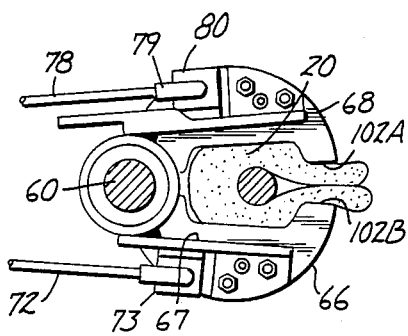
FIG. 6 is a schematic representational view of the dough forming actuator at the end of the forming action.

The closing movement of the clam shell cup portions means that the leading edges of the clam shell cup portions shown generally at 102A and 102B, in FIG. 4 and FIG. 5, will engage the respective end portions 20A and 20B of the dough piece 20, and will push this dough piece so that it forms around the mandrel 46. The dough end portions 20A and 20B then move in an arc to a position as shown in FIG. 6. By selecting the spacing between the end portions 102A and 102B of the clam shell cup portions, the end portions 20A and 20B can be pinched together so that the dough piece will be formed and held in this position.

When the arm 75 has completed its stroke, an actuator button 111 of a valve 110 that is carried on this arm engages an adjustable stop or sensor 112. As soon as the valve 110 is actuated by engagement with the adjustable stop or sensor 112, it provides a signal that the dough piece has been formed the desired amount. Valve 110 will actuate the pneumatic cylinder 33 to retract the rod 35, and through the pivot bolt 36 and bracket 37, swing the entire frame assembly 29 about the first mentioned pivot 31 to raise the clam shell cup portions and the mandrel a sufficient distance off the belt so that the dough piece 20 that has just been formed, and which is shown in FIG. 3 at its position 20D will clear the lower end of the mandrel and of the cup.

Upon retraction of the cylinder 33 to this position, a further sensor is actuated for example an ordinary limit valve 115 mounted on the frame member 12 sensing the position of the frame 29, to reverse operation of the cylinder 86.

Figure 3:
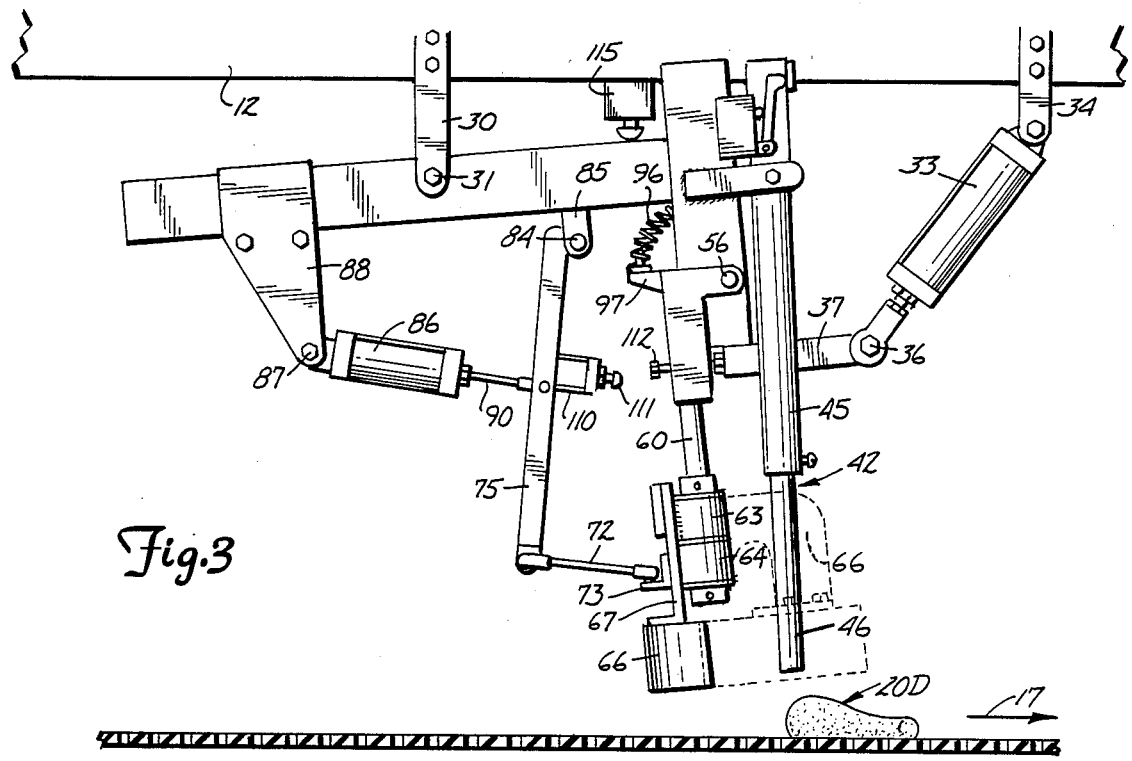
FIG. 3 is a side view of FIG. 2 showing a croissant that has been folded removed from the forming apparatus, and the machine moving toward a reset position.

Then quickly the cylinder 86 will retract to open the clam shell cup sections as shown in FIG. 3, and drop the formed dough piece, and the cylinder 33 will start to extend as soon as the valve 110 is released from the stop 112.

This return action is very quick, so that the clam shell cup portions open quickly. The limit valve 115 also can be used for providing a blast of air from an air source shown schematically at 116 in FIG. 5, into suitable conduits 117 that have fittings on the brackets 65 and 67, respectively, that form air jets creating a force downwardly on the insides of the cup portions acting on the formed dough piece tending to force the dough off the mandrel and off the cup portions.

Thus as the clam shell cup portions open, the dough piece will be forced off the mandrel and back onto the conveyor belt 16 to be carried on for baking.

In some instances, it is desirable to have the dough pieces cooled and levitated while they are being moved by the belt 16, because the pieces are more easily handled and less likely to stick when the dough is cool, and also the air will levitate the pieces slightly to urge them up from the belt 16 on a cushion of air. The dough pieces also will move easier relative to the belt. A plenum chamber 120 may be positioned below the conveyor belt 16 and the plenum chamber 120 has a plurality of nozzles 121 that direct air indicated by the arrows 122 from a refrigerated air source 125 through openings 126 in the belt 16 with a sufficient pressure to tend to lift the dough pieces 20 slightly, and to keep the dough piece surfaces cool while they are being moved. The plenum chamber 120 extends for only a short distance along the belt, but in the section above the chamber, the dough is floated on an air cushion for handling. The plenum can extend across the width of the belt. The dough pieces are spaced in lines across the belt and several pieces are formed at the same time across the belt.

The perforation or holes 126 in belt 16 can be made in a conventional manner and spaced as desired. The holes 126 can also be selected for proper size, as desired. The refrigerated air makes the dough less likely to stick to the forming cup portions and mandrel.

The method of forming comprises the moving of the elongated pieces of dough in a direction generally perpendicular to the axis of the dough, and preferably providing a mandrel that will signal that the dough it is in a desired position, and then moving an actuator forming member faster than the movement of the dough, and generally in the same direction at the same time that the ends of the forming member are moved at a differential in speed with respect to the center portions, until the end portions move together. As shown the end portions are pinched together to tend to cause them to adhere to each other, thus forming a general circle. Preferably the dough is formed around a mandrel. After forming, the mandrel and the forming members are then released, so that the dough is placed back into its conveyor and continues to move along its path of travel.

In addition to the pivoting device that is shown, the clam shell like cup portions can be mounted onto a large paddle wheel that rotates, and upon a signal the cup portions would engage properly positioned pieces of dough to form them either around a mandrel or without a mandrel. In other words, the actual arcuate movement of a wheel will provide the necessary motion of moving the dough forming actuator from a position spaced from the conveyor sufficiently to permit the dough to pass underneath, to a position to engage the dough, that is a position adjacent the conveyor belt, and then subsequent to the forming operation move in the path of travel again to a location to clear the dough to permit it to move in its path.

While mechanical type sensors are shown herein, infrared sensors, ultrasonic sensors, induction sensors, or other non-contact proximity sensors can be utilized, and time delays can be used for actuating the devices at a known interval after a piece of dough has been sensed, if desired. Thus, the dough piece to be formed may be sensed before it reaches the mandrel. These sensors will sense a product wihout touching the product. Electrical actuators may be used instead of penumatic actuators, and switches or other electrical controls may be used. The sequences of operation also can easily be controlled with a microprocessor.

The clam shell cup portion forming devices can be replaced by paddles or even with a brush that would move the ends of the dough around a mandrel or toward each other to cause the croissant dough to curl.

If the entire mechanism including the sensor mandrel is mounted on a wheel, then the wheel could momentarily stop until the sensor was engaged by a piece of dough, and then rotate on, and instead of reversing just continue to rotate, with another set of formers and a sensing mandrel moving into position as the wheel rotated.

The forming action of forming an elongated item around a mandrel may be used for assembly and/or forming parts, or for example placing a label around a carton. The apparatus may be mounted on a robot arm for operation as well.

Although the present invention has been described with reference to preferred embodiments, workers skilled in the art will recognize that changes may be made in form and detail without departing from the spirit and scope of the invention.

What is claimed is:

1. An apparatus for forming an elongated piece of material about an axis extending generally perpendicular to the longitudinal axis of the material piece comprising
    means for conveying said material piece with its longitudinal axis oriented to be substantially perpendicular to the direction of moving of the material;
    forming means movable in a path generally such that the forming means overlies the material piece during a portion of a path of movement of the material piece on said means for conveying;
    means to sense location of a material piece; and
    a core forming member positioned to intercept a material piece as it is moved and be positioned immediately ahead of such material piece;
    said forming means having wall portions movable from a first position wherein the wall portions are separated toward a position wherein the wall portions move to a second position with at least sections of the wall portions moving toward each other, and to position the wall portions so that they move the ends of a material piece moving on the means for conveying a least partially around the core forming member when in the second position in response to said means to sense location of said piece.

2. The apparatus of claim 1 wherein the means to sense the position of a material piece indicates that the dough piece is adjacent said core forming member, with the end portions of said material piece extending laterally in opposite sides of said core forming member, and said forming means being movable generally in an arcuate path such that the forming means moves in the same direction as a sensed material piece, said wall portions that move toward said mandrel forming the end portions of the material piece on opposite sides of said core forming member toward each other as the wall portions move in said arcuate path, and means to open said wall portions relative to said core forming member when the wall portions have moved together a desired amount.

3. The apparatus as specified in claim 2 wherein said means to open said wall portions comprises means to reverse movement of said wall portions in the arcuate path of the forming means to reset the wall portions to the original position.

4. The apparatus as specified in claim 2 wherein said wall portions comprise a pair of cylindrical walls hingedly connected together about an axis parallel to the axis of the part cylindrical walls, said axis being generally normal to the plane of movement of said material piece in its path of movement.

5. The apparatus of claim said 2 wherein said material is an elongated dough piece, and said core forming member comprises a mandrel mounted in a desired location relative to said wall portions, said wall portions forming cup portions being movable toward said mandrel as the forming means moves in an arcurate path.

6. The apparatus as specified in claim 5 wherein said means to sense includes a sensor positioned to sense movement of said mandrel when the mandrel is engaged by a dough piece moving in its path of movement.

7. The apparatus as specified in claim 6 wherein said mandrel and said cup portions are both mounted onto a common frame member that moves in an arcuate path about a common pivot axis generally parallel to the longitudinal axis of the dough pieces.

8. The apparatus as specified in claim 7 wherein said forming means comprises an arm mounted about a second pivot independent of and spaced from the common pivot axis mounting the common frame member for the mandrel and the cup portions, said arm being movable from a position about the second pivot wherein the cup portions will clear a dough piece passing underneath the cup portions to a position wherein a lower edge plane of said cup portions is adjacent a support plane for said dough pieces, and means to move said cup portions about a pivotal connection between the cup portions subsequent to movement of the arm about the second pivot.

9. The apparatus as specified in claim 8 wherein said means to move the cup portions comprises a second arm mounted about a third pivot independent of the common pivot axis and the second pivot, said second arm being operable to move about the third pivot subsequent to the movement of the first mentioned arm about the second pivot, and link means between the second arm and each of the cup portions to force the cup portions to move about the hinge connection joining the cup portions after the first mentioned arm has moved to its first mentioned position.

10. The apparatus as specified in claim 9 and a common pneumatic cylinder connected to said second arm, said cup portions being mounted on said first arm about said axis joining the cup portions, and said second arm and said line being operable to force the first arm about the second pivot prior to the time the cup portions are moved about the hinged connection joining the cup portions.

11. The apparatus as specified in claim 10 and a second pneumatic cylinder operable to move the mandrel, and the cup portions, about the first mentioned pivot for the common frame member subsequent to the operation of the cup portions to their closed position around said mandrel.

12. The apparatus as specified in claim 11 and means to open said cup portions subsequent to the closing motion, said means to open including second sensor means, and means operable for exerting a force tending to remove the dough piece from its position around said mandrel in response to said second sensor means.

13. The apparatus as specified in claim 12 wherein said means to provide a force comprises an air jet means acting on said dough portions.

14. The apparatus as specified in claim 9 wherein said cup portions have generally cylindrical walls that are mounted together about the hinged connection along a generally diametral plane, the free ends of said part cylindrical walls being positioned, with the cup portions in the closed position, to pinch the end portions of the engaged dough piece together to tend to hold the dough piece end portions formed around said mandrel and retained relative to each other.

15. The apparatus as specified in claim 5 and means to provide an air cushion to tend to support said dough pieces as said dough pieces are moved in their path of movement.

* * * * *